United States Patent
Kim et al.

(10) Patent No.: US 11,742,928 B2
(45) Date of Patent: Aug. 29, 2023

(54) TERMINAL PERFORMING BEAM SWEEPING OPERATION AND METHOD OF OPERATION THEREOF

(71) Applicant: SAMSUNG ELECTRONICS CO., LTD., Suwon-si (KR)

(72) Inventors: Jaein Kim, Seoul (KR); Jonggun Moon, Seongnam-si (KR); Junho Lee, Hwaseong-si (KR); Huiwon Je, Osan-si (KR); Seungjin Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/742,894

(22) Filed: May 12, 2022

(65) Prior Publication Data

US 2023/0046984 A1 Feb. 16, 2023

(30) Foreign Application Priority Data

Aug. 11, 2021 (KR) .................. 10-2021-0106245

(51) Int. Cl.
*H04B 7/06* (2006.01)
*H04B 7/08* (2006.01)
(Continued)

(52) U.S. Cl.
CPC ......... *H04B 7/0695* (2013.01); *H04B 7/0456* (2013.01); *H04B 7/088* (2013.01);
(Continued)

(58) Field of Classification Search
CPC ..... H04W 72/23; H04W 24/10; H04W 72/21; H04W 72/0446; H04W 72/1268; H04W 72/046; H04W 72/0453; H04W 72/1273; H04W 72/51; H04W 16/28; H04L 5/0048; H04L 5/0051; H04L 5/0053;
(Continued)

(56) References Cited

U.S. PATENT DOCUMENTS 9,215,650 B2  12/2015 Jung
10,057,025 B2  8/2018 Park et al.
(Continued)

FOREIGN PATENT DOCUMENTS

KR  10-2021-0020841 A  2/2021

*Primary Examiner* — Eva Y Puente
(74) *Attorney, Agent, or Firm* — Sughrue Mion, PLLC

(57) ABSTRACT

A method of operating a communication device includes: sweeping a plurality of first reception beams; measuring reference signals, received from another communication device, based on the plurality of first reception beams; estimating a downlink channel gain based on the measured reference signals and reception array response information corresponding to reception antenna characteristics of the communication device; generating a downlink channel related matrix based on the downlink channel gain and the reception array response information; determining a second reception beam based on the downlink channel related matrix; determining a transmission beam based on at least one of the downlink channel gain, the downlink channel related matrix, and the second reception beam; and performing communication with the other communication device using the second reception beam and the transmission beam.

20 Claims, 10 Drawing Sheets

(51) Int. Cl.
  *H04B 7/0456* (2017.01)
  *H04B 17/336* (2015.01)
  *H04W 72/044* (2023.01)
  *H04W 72/23* (2023.01)
  *H04W 16/28* (2009.01)

(52) U.S. Cl.
  CPC ........ *H04B 17/336* (2015.01); *H04W 72/046* (2013.01); *H04W 72/23* (2023.01); *H04W 16/28* (2013.01)

(58) Field of Classification Search
  CPC ..... H04L 5/0094; H04L 5/0023; H04L 5/001; H04L 1/08; H04B 7/0617; H04B 7/0456; H04B 7/0626; H04B 7/0413; H04B 7/0417; H04B 7/0639; H04B 7/0452
  USPC ........................................................ 375/262
  See application file for complete search history.

(56) References Cited

U.S. PATENT DOCUMENTS

| | | |
|---|---|---|
| 10,779,273 B2 | 9/2020 | Wilson et al. |
| 10,986,644 B2 | 4/2021 | Luo et al. |
| 2020/0212978 A1* | 7/2020 | Zhao .................... H04B 7/0617 |
| 2021/0092795 A1 | 3/2021 | Yang |
| 2021/0119688 A1 | 4/2021 | Enescu et al. |
| 2021/0337549 A1* | 10/2021 | Zhang .................. H04L 5/0048 |
| 2022/0095145 A1* | 3/2022 | Sakhnini ............... H04L 5/0048 |
| 2023/0039220 A1* | 2/2023 | Bai ..................... H04B 7/0695 |

\* cited by examiner

# TERMINAL PERFORMING BEAM SWEEPING OPERATION AND METHOD OF OPERATION THEREOF

CROSS-REFERENCE TO RELATED APPLICATION

This application is based on and claims priority from Korean Patent Application No. 10-2021-0106245, filed on Aug. 11, 2021, in the Korean Intellectual Property Office, the disclosure of which is incorporated herein in its entirety by reference.

BACKGROUND

1. Field

The disclosure relates to a terminal that performs a beam sweeping operation and determines a transmission/reception beam to improve communication performance.

2. Description of Related Art 5G communication as new wireless communication technology is aiming to provide an ultra high-speed data service of several Gbps using an ultra-wideband with a bandwidth of 100 MHz or more beyond the existing long-term evolution (LTE) and LTE-advanced (A). However, as it is difficult to secure an ultra-wideband frequency of 100 MHz or more in a frequency band of several hundred MHz or several GHz used in LTE and LTE-A, a method of transmitting a signal using a wide frequency band existing in a frequency band of 6 GHz or more is considered in 5G communication systems. In more detail, in the 5G communication systems, increasing a transmission rate by using a millimeter wave band such as a 28 GHz band or a 60 GHz band is being considered. However, since a frequency band and a path loss of a radio wave are proportional, the path loss of the radio wave becomes large in such a very high frequency wave, and a service area is reduced.

In order to overcome drawbacks of service area reduction in the 5G communication systems, beamforming technology for increasing a reaching distance of a radio wave by generating a directional beam using a plurality of antennas is emphasized. The beamforming technology may be applied to a base station and a terminal, respectively. In addition to the expansion of the service area, the beamforming technology may also reduce interference due to physical beam focusing in a target direction. In the 5G communication systems, the direction of a transmission beam of the base station and the direction of a reception beam of the terminal need to be mutually aligned to increase the effect of the beamforming technology. Thus, a technique for determining optimal transmission beams and reception beams has been researched.

As a method of optimizing performance in the 5G communication systems, an operation of transmitting and receiving signals by applying beamforming using a large number of antenna arrays in the terminal is being actively used. When operating using a time-division method, by utilizing channel reciprocity, the terminal may use a reception beam for receiving a signal in a downlink even when transmitting a signal in an uplink. However, actual transmission/reception radio frequency (RF) chains are independently connected to the antenna arrays, and a phase shifter used in the antenna arrays is imperfect, and thus, it is difficult to ensure perfect channel reciprocity. Imperfect channel reciprocity may cause performance degradation of the terminal. Accordingly, a technique for determining a transmission/reception beam by compensating for imperfect channel reciprocity is required.

SUMMARY

The embodiments provide a terminal for determining a reception beam and a transmission beam by compensating for imperfect channel reciprocity between an uplink and a downlink in a wireless communication system, and an operating method thereof.

According to an aspect of embodiments, there is provided a method of operating a communication device that may include: sweeping a plurality of first reception beams; measuring reference signals, received from another communication device, based on the plurality of first reception beams; estimating a downlink channel gain based on the measured reference signals and reception array response information corresponding to reception antenna characteristics of the communication device; generating a downlink channel related matrix based on the downlink channel gain and the reception array response information; determining a second reception beam based on the downlink channel related matrix; determining a transmission beam based on at least one of the downlink channel gain, the downlink channel related matrix, and the second reception beam; and performing communication with the other communication device using the second reception beam and the transmission beam.

According to another aspect of embodiments, there is provided a communication device that may include: a plurality of reception antenna arrays; a plurality of first radio frequency (RF) chains respectively connected to the plurality of reception antenna arrays; and a controller configured to control the plurality of reception antenna arrays and the plurality of first RF chains, wherein the controller is configured to sweep a plurality of first reception beams using the plurality of reception antenna arrays, measure reference signals received from another communication device based on the plurality of first reception beams, estimate a downlink channel gain based on the measured reference signals and reception array response information corresponding to characteristics of the plurality of reception antenna arrays, generate a downlink channel related matrix based on the downlink channel gain and the reception array response information, determine a second reception beam based on the downlink channel related matrix, determine a transmission beam based on at least one of the downlink channel gain, the downlink channel related matrix and the second reception beam, and control communication with the other communication device using the second reception beam and the transmission beam.

According to still another aspect of embodiments, there is provided a method of operating a terminal that may include: sweeping a plurality of first reception beams; measuring reference signals, received from another communication device, based on the plurality of first reception beams; estimating a downlink channel gain based on the measured reference signals and reception array response information corresponding to reception antenna characteristics of the communication device; reconfiguring a downlink channel based on the downlink channel gain; reconfiguring an uplink channel based on at least one of the downlink channel gain and the downlink channel; determining a transmission beam and a reception beam based on the downlink channel and the uplink channel; and performing communication with the other communication device using the reception beam and the transmission beam.

BRIEF DESCRIPTION OF DRAWINGS

The embodiments will be more clearly understood from the following detailed description taken in conjunction with the accompanying drawings, in which.

DETAILED DESCRIPTION OF EMBODIMENTS

Figure 1:
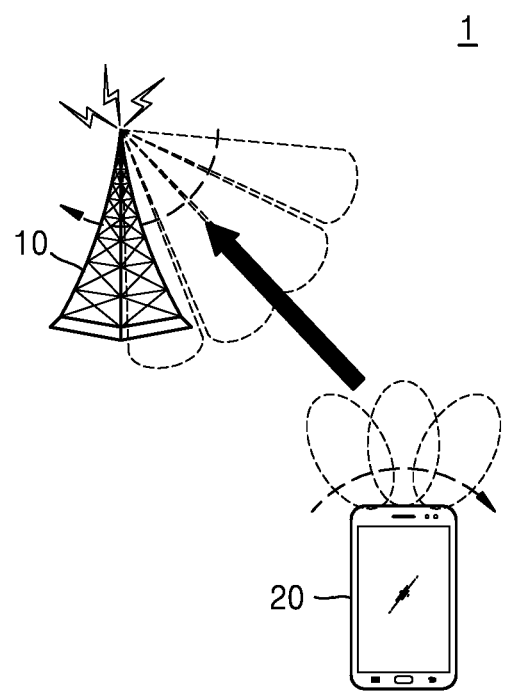
FIG. 1 is a block diagram of a wireless communication system according to an embodiment.

All of the embodiments described herein are example embodiments, and thus, the inventive concept is not limited thereto and may be realized in various other forms. As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

A base station communicates with a terminal and allocates communication network resources to the terminal. The base station may be at least one of a cell, a base station (BS), a NodeB (NB), an eNodeB (eNB), a next generation radio access network (NG RAN), a radio access unit, a base station controller, or a node on a network. Hereinafter, the base station is referred to as a cell.

The terminal is a subject that communicates with the base station or another terminal, and may be referred to as a wireless communication device, a communication device, a node, user equipment (UE), next generation UE (NG UE), a mobile station (MS), mobile equipment (ME), or a device.

Examples of the terminal may include smart phone, tablet personal computer (PC), mobile phone, video telephone, E-book reader, desktop PC, laptop PC, netbook computer, portable multimedia player (PMP), MP3 player, medical device, camera, and wearable device. Additional examples of the terminal may include television (TVs), digital video disk (DVD) player, audio, refrigerator, air conditioner, vacuum cleaner, oven, microwave oven, washing machine, air purifier, set-top boxe, home automation control panel, security control panel, media boxe (e.g., Samsung Home-Sync™, Apple TV™, or Google TV™), game console (e.g., Xbox™ PlayStation™), electronic dictionarie, electronic key, camcorder, electronic photo frame, at least one of various medical devices (e.g., various portable medical measuring instruments (such as a blood glucose meter, a heart rate meter, a blood pressure meter, or a body temperature meter), magnetic resonance angiography (MRA), magnetic resonance imaging (MRI), computed tomography (CT), cameras, or ultrasound devices), navigation device, global navigation satellite system (GNSS), event data recorder (EDR), flight data recorder (FDR), automotive infotainment device, marine electronic device (e.g., marine navigation device, gyro compass, etc.), avionics, security device, car head unit, industrial or household robot, drone, automatic teller machine (ATMs) at financial institutions, point of sale (POS) of store, or Internet of Things (IoT) device (e.g., light bulb, various sensor, sprinkler device, fire alarm, thermostat, street light, toaster, exercise equipment, hot water tank, heater, boiler, etc.). Furthermore, various types of multimedia systems capable of performing communication functions may be examples of the terminal.

Hereinafter, embodiments of the disclosure will be described in detail with reference to the accompanying drawings.

FIG. 1 is a block diagram of a wireless communication system 1 according to an embodiment. Hereinafter, the disclosure are mainly described through an embodiment in which a terminal 20 determines a reception beam and a transmission beam considering imperfect channel reciprocity between a downlink and an uplink, but the inventive concept may be sufficiently applied to an operation of determining a reception beam and a transmission beam in a base station 10. In addition, it is clear that the inventive concept is not limited only between the base station 10 and the terminal 20, and may also be applied between the terminal 20 and other terminals (not shown) and between the base station 10 and other base stations (not shown).

Referring to FIG. 1, the wireless communication system 1 may include the base station 10 and the terminal 20. For convenience of description, the wireless communication system 1 is illustrated as including only one base station 10, but this is only an example, and the disclosure is not limited thereto. The wireless communication system 1 may be implemented to include various numbers of base stations. The base station 10 may be connected to the terminal 20 through a wireless channel to provide various communication services. The base station 10 may schedule all user traffic to be serviced through a shared channel, and may collect state information such as a buffer state, an available transmission power state, and a channel state of the terminal 20. The wireless communication system 1 may support beamforming technology by using orthogonal frequency division multiplexing (OFDM) as radio access technology. The wireless communication system 1 may also support a modulation scheme and an adaptive modulation and coding (AMC) scheme for determining a channel coding rate, according to a channel state of the terminal 20.

The wireless communication system 1 may transmit and receive signals using a wide frequency band existing in a frequency band of 6 GHz or more. For example, in the wireless communication system 1, a data transmission rate may be increased by using a millimeter wave band such as a 28 GHz band or a 60 GHz band. Because the millimeter wave band has a relatively large signal attenuation amount per distance, the wireless communication system 1 may support directional beam-based transmission and reception, the directional beam being generated using multiple antennas for ensuring coverage. The wireless communication system 1 may be a system supporting multiple input and multiple output (MIMO), and accordingly, the base station 10 and the terminal 20 may support beamforming technology. The beamforming technology may be divided into digital beamforming, analog beamforming, hybrid beamforming, and the like, and may all be applied to the wireless communication system 1 under the present embodiment.

The terminal 20 may receive reference signals from the base station 10 by sweeping a plurality of first reception beams. Beam sweeping may mean that the base station 10 and the terminal 20 sequentially or randomly sweep a directional beam having a certain pattern, respectively. The base station 10 may transmit a reference signal to the terminal 20 a plurality of times by sweeping a plurality of transmission beams. In an embodiment, the reference signal may be any one of a synchronization signal block (SSB) and a channel state information-reference signal (CSI-RS). The terminal 20 may measure reference signals respectively received based on the plurality of first reception beams. In this specification, the measuring of the reference signals may be interpreted as measuring a phase and a magnitude corresponding to a complex portion of the reference signals. However, the measuring of the reference signals is not limited thereto, and may be interpreted as measuring various parameters indicating characteristics of reference signals that have been received through a downlink channel. In addition, in this specification, the measured reference signals may be defined by a phase and a magnitude of each of the measured reference signals.

In an embodiment, the terminal 20 may estimate a downlink channel gain based on reference signals and reception array response information matching or corresponding to reception antenna characteristics of the terminal 20. In this specification, the downlink channel gain may be defined as a parameter used for estimating (or reconfiguring) a downlink channel considering imperfect channel reciprocity between the downlink channel and an uplink channel. In some embodiments, the downlink channel gain may also be used when estimating (or reconfiguring) the uplink channel. In an embodiment, reception array response information is response information based on characteristics resulting from a structure of a plurality of reception antenna arrays included in the terminal 20 and RF chains respectively connected to the reception antenna arrays, and may include first information matrices respectively corresponding to a plurality of first RF chains connected to the plurality of reception antenna arrays. In some embodiments, preset angles of arrival may be applied to the first information matrices. The reception array response information may also be referred to as downlink array response information. In an embodiment, the downlink channel gain may include a channel gain for each angle of arrival in each of the plurality of first RF chains.

In an embodiment, the terminal 20 may find a solution that minimizes a difference between the reference signals and a result of multiplication of the downlink channel gain, the reception array response information and a reception beam matrix, and may determine the solution as a value of the downlink channel gain. In this disclosure, the reception beam matrix may be a matrix corresponding to any one of the plurality of first reception beams or a matrix independent of the plurality of first reception beams. In addition, the reception beam matrix may correspond to a sub-reception beam formed through any one of the plurality of first RF chains. In this specification, a sub-reception beam formed through an RF chain may mean a sub-reception beam formed in an antenna array connected to the corresponding RF chain, and a plurality of sub-reception beams may constitute one reception beam.

In an embodiment, the terminal 20 may estimate (or reconfigure) a downlink channel based on the downlink channel gain and the reception array response information. In more detail, the terminal 20 may generate a downlink channel related matrix by multiplying the downlink channel gain and the reception array response information. The downlink channel related matrix may include matrices respectively corresponding to the plurality of first RF chains of the terminal 20. That is, the downlink channel related matrix may include matrices indicating channels respectively corresponding to the plurality of first RF chains. In this specification, a matrix or information corresponding to one RF chain may be interpreted as a matrix or information corresponding to an antenna array connected to the RF chain, and, hereinafter, it will be described as a matrix or information corresponding to an RF chain.

In an embodiment, the terminal 20 may determine a second reception beam based on the downlink channel related matrix. In more detail, the terminal 20 may calculate downlink channel states using the downlink channel related matrix and reception beam matrices, and may determine a reception beam corresponding to a reception beam matrix corresponding to the best state from among the downlink channel states as the second reception beam. In other words, the terminal may determine, as the second reception beam, a reception beam formed by reception beam matrices respectively corresponding to the plurality of first RF chains providing an optimal downlink channel state. In an embodiment, the downlink channel states may indicate any one of channel capacities and a signal-to-interference-plus-noise ratio (SINR).

In an embodiment, the terminal 20 may determine a transmission beam based on at least one of the downlink channel gain, the downlink channel related matrix, and the second reception beam.

For example, the terminal 20 may calculate an uplink channel related matrix by multiplying the downlink channel gain and transmission array response information matching or corresponding to transmission antenna characteristics of the terminal 20, and may determine a transmission beam based on the uplink channel related matrix. In other words, the terminal 20 may use the downlink channel related matrix for calculation of the uplink channel related matrix considering the reciprocity between the downlink channel and the uplink channel. In this disclosure, the operation of the terminal 20 calculating the uplink channel related matrix may be defined as uplink channel estimation (or reconfiguration). In an embodiment, the transmission array response information is response information based on characteristics resulting from a structure of a plurality of transmission antenna arrays included in the terminal 20, and may include second information matrices respectively corresponding to a plurality of second RF chains connected to the plurality of transmission antenna arrays. In some embodiments, preset angles of departure may be applied to the second information matrices. The transmission array response information may also be referred to as uplink array response information.

As another example, the terminal 20 may generate an uplink channel related matrix based on a downlink channel related matrix and downlink-uplink calibration information. In other words, the terminal 20 may use the downlink channel related matrix for calculation of the uplink channel related matrix considering the reciprocity between a downlink channel and an uplink channel. In an embodiment, the downlink-uplink calibration information includes calibration data applied to the downlink channel related matrix to obtain the uplink channel related matrix, and may be obtained in a certain training mode or may be stored in a certain storage device. In more detail, the downlink-uplink calibration information may be determined by a correlation between a hardware structure of a first radio frequency integrated circuit (RFIC) of the terminal 20 for reception and a hardware structure of the second RFIC of the terminal 20 for transmission. For example, the terminal 20 may generate the uplink channel related matrix by multiplying the downlink channel related matrix and the downlink-uplink calibration information.

As another example, the terminal 20 may determine a beam corresponding to the second reception beam as a transmission beam with reference to transmission/reception beam pair information. In other words, the terminal 20 may determine the transmission beam by using the second reception beam determined considering the reciprocity between the downlink channel and the uplink channel. In an embodiment, the transmission/reception beam pair information may include information about a transmission beam and a reception beam that are paired with each other, and the terminal may check the reception beam determined as the current second reception beam from the transmission/reception beam pair information, and determine a beam corresponding to the checked reception beam as the transmission beam.

The terminal 20 according to an embodiment may estimate (or reconfigure) at least one of a downlink channel and an uplink channel based on antenna characteristics (e.g., hardware characteristics of RFICs for transmission and reception) in the terminal 20 to compensate for imperfect channel reciprocity between a downlink and an uplink, and may determine a reception beam and a transmission beam using a result of the estimation. Through this, the terminal 20 may determine a reception beam and a transmission beam capable of providing optimal performance in an actual communication environment.

Figure 2A:
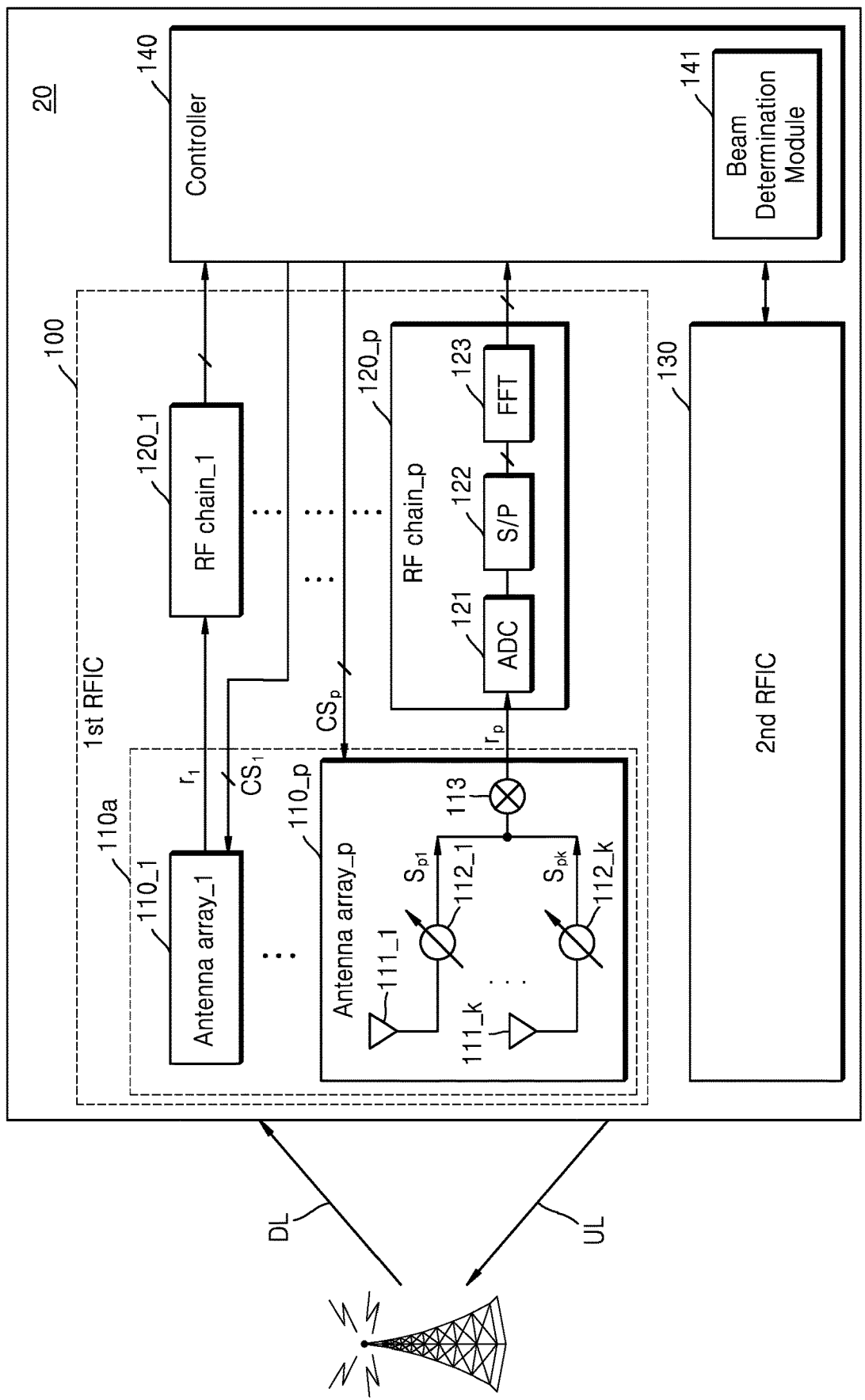
FIG. 2A is a detailed block diagram of a terminal including an antenna module according to an embodiment.
Figure 2B:
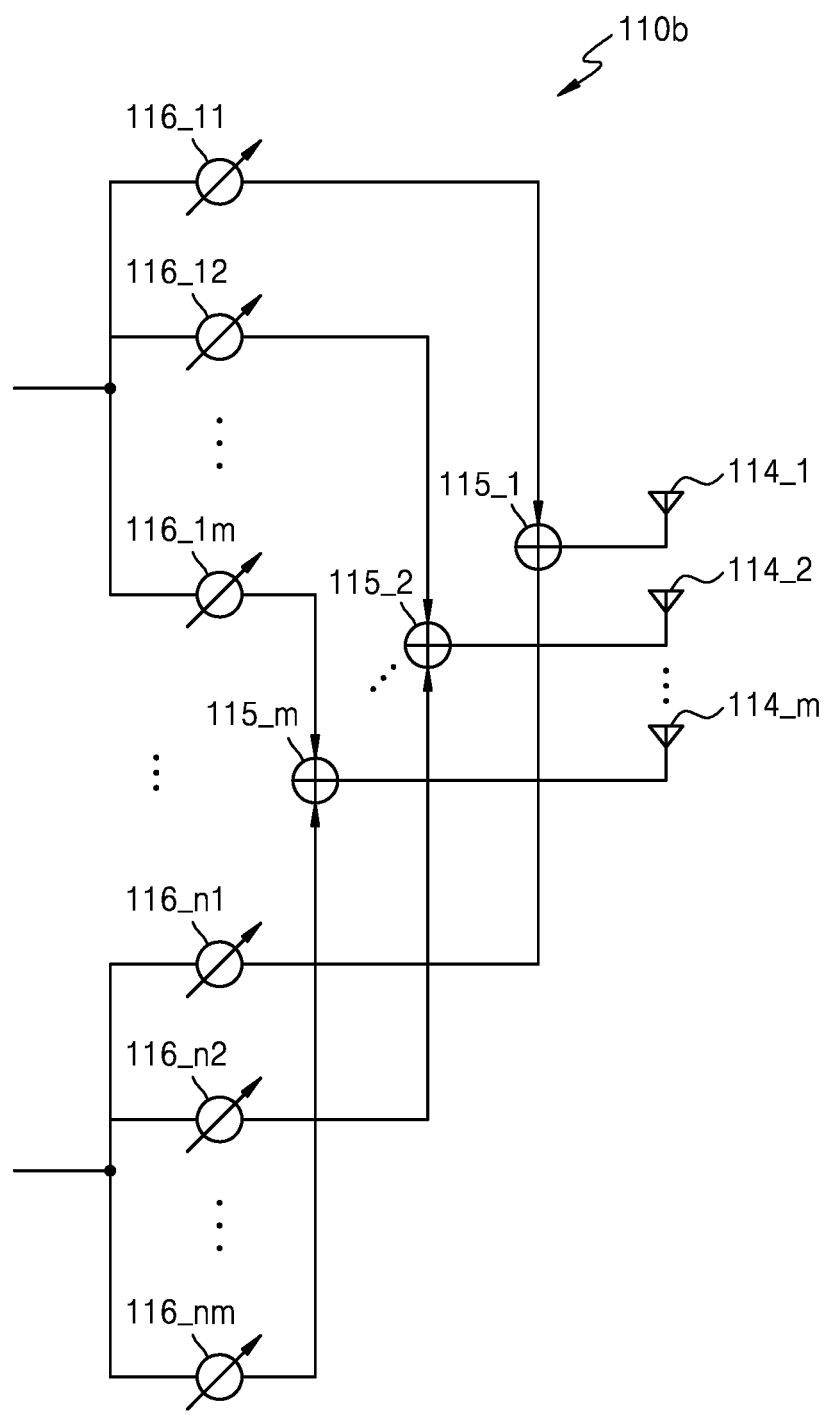
FIG. 2B is a view illustrating an embodiment of the antenna module.

FIG. 2A is a block diagram illustrating the terminal 20 including an antenna module 110a according to an embodiment, and FIG. 2B is a view illustrating an embodiment of an antenna module 110b.

Referring to FIG. 2A, the terminal 20 may include a first RFIC 100, a second RFIC 130, and a controller 140. In this specification, the first RFIC 100 may be referred to as a reception RFIC, and the second RFIC 130 may be referred to as a transmission RFIC. The first RFIC 100 may receive a downlink signal from the base station 10 through a downlink DL, and the second RFIC 130 may transmit an uplink signal to the base station 10 through an uplink UL.

The first RFIC 100 may include the antenna module 110a and a plurality of first RF chains 120_1 to 120_p. The antenna module 110a may include a plurality of antenna arrays 110_1 to 110_p. Output terminals of the plurality of antenna arrays 110_1 to 110_p may be respectively connected to the first RF chains 120_1 to 120_p. The p$^{th}$ antenna array 110_p may include a plurality of antenna elements 111_1 to 111_k, a plurality of phase shifters 112_1 to 112_k, and a summer 113. A sub-reception beam formed in the p$^{th}$ antenna array 110_p may be controlled through phase control of the plurality of phase shifters 112_1 to 112_k. The p$^{th}$ antenna array 110_p shown in FIG. 2A is a partially-connected structure. The plurality of antenna elements 111_1 to 111_k included in the p$^{th}$ antenna array 110_p may be interconnected through the summer 113 and be separated from a plurality of antenna elements (not shown) included in the other antenna arrays 110_1 to 110_p-1.

Referring further to FIG. 2B, the antenna module 110b may be implemented in a fully-connected structure unlike FIG. 2A. In more detail, the antenna module 110b may include a plurality of antenna elements 114_1 to 114_m, a plurality of summers 115_1 to 115_m, and a plurality of phase shifters 116_11 to 116_1m, . . . , 116_n1 to 116_nm. Two antenna elements from among the plurality of antenna elements 114_1 to 114_m may be connected to each other through any one of the plurality of summers 115_1 to 115_m. The antenna module 110b may be defined as one antenna array.

In summary, the antenna module 110a in FIG. 2A corresponds to an implementation in which an independent antenna array for each reception path is used, and the antenna module 110b in FIG. 2B may correspond to an implementation in which reception paths share one antenna array. Depending on the implementation of the antenna module, reception array response information to be described later below may differ.

The p$^{th}$ RF chain 120_p connected to the p$^{th}$ antenna array 110_p may include an analog-to-digit converter (ADC) 121, a serial-to-parallel converter 122, and a fast Fourier transformer 123. The configuration of the p$^{th}$ antenna array 110_p may also be applied to the remaining antenna arrays 110_1 to 110_p-1, and the configuration of the p$^{th}$ RF chain 120_p may also be applied to the remaining RF chains 120_1 to 120_p-1.

In an embodiment, reception array response information about the first RFIC 100 may be determined according to a distance between the antenna arrays 110_1 to 110_p of the antenna module 110a, a location, a connection relationship between the antenna arrays 110_1 to 110_p and the first RF chains 120_1 to 120_p, and the like.

The second RFIC 130 may include a configuration similar to that of the first RFIC 100. Transmission array response information about the second RFIC 130 may be determined according to a distance between antenna arrays of an antenna module of the second RFIC 130, a connection relationship between the antenna arrays and second RF chains, and the like. In some embodiments, the reception array response information and the transmission array response information may be different from each other.

The controller 140 according to an embodiment may include a beam determination module 141. A component included in the controller 140 may be implemented by a dedicated hardware block designed through logic synthesis, etc., a processing unit including at least one processor and a software block executed by the at least one processor, or a combination of the dedicated hardware block and the processing unit. In this specification, the controller 140 may be defined as a device for estimating a channel of the downlink DL or a channel of the uplink UL considering imperfect channel reciprocity between the downlink DL and the uplink UL resulting from the structure of the terminal 20, and finding an optimal reception beam and an optimal transmission beam based thereon.

Referring again to FIG. 2A, the beam determination module 141 according to an embodiment may perform a beam sweeping operation by providing control signals $CS_1$ to $CS_p$ to the antenna arrays 110_1 to 110_p, respectively. The beam determining module 141 may sequentially or randomly form first reception beams through the beam sweeping action to receive reference signals transmitted from the base station 10 based on the first reception beams. The channel of the downlink DL may be defined as Equation 1.

$$H = \begin{bmatrix} H_1 \\ \vdots \\ H_{N_{RF}} \end{bmatrix} \in \mathbb{C}^{N \times N_{gNB}} \quad \text{[Equation 1]}$$

H is a channel of the downlink DL and may have a matrix form of N×N$_g$NB. N may be calculated as a product between N$_{RF}$ and Nant. It may mean the number of antenna elements of N$_{gNB}$. Ha (where a is an integer greater than or equal to 1) may be a channel between an a$^{th}$ RF chain and the base station 10. N$_{ant}$ may be the number of antenna elements (e.g., k (where k is an integer greater than or equal to 1)) included in the antenna arrays 110_1 to 110_p respectively connected to the first RF chains 120_1 to 120_p. N$_{RF}$ may be the number of first RF chains 120_1 to 120_p (e.g., p (where p is an integer greater than or equal to 1)) of the terminal 20.

In an embodiment, a reference signal that the terminal 20 receives from the base station 10 may be defined as Equation 2.

$$Y_s = \begin{bmatrix} y_{s,1} \\ \vdots \\ y_{s,N_{RF}} \end{bmatrix} = W_s R(HF_{gNB} + N) \in \mathbb{C}^{MN_{RF} \times M_{gNB}} \quad \text{[Equation 2]}$$

Y$_s$ is a reference signal received from the terminal 20, and may have a matrix form of Cambria Math. M is the number of reference signals transmitted from the base station 10 to the terminal 20 using an identical transmission beam. Cambria Math is the number of transmission beams simultaneously used by the base station. W$_s$ is a reception beam matrix for first reception beams swept by the terminal 20, and may have a matrix form of MN$_{RF}$×N. R is a reception response matrix, and may have a matrix form of N×N. F$_{gNB}$ is a matrix corresponding to the transmission beam of the base station 10 and may have the form of Ng$_{NB}$×Mg$_{NB}$. N is reception noise and may have a matrix form of N×Mg$_{NB}$.

Hereinafter, the beam determination module 141 is mainly described for calculating matrices in the p$^{th}$ antenna array 110_p or the p$^{th}$ RF chain 120_p, but the beam determination module 141 may calculate matrices in the other antenna arrays 110_1 to 110_p-1 or the other RF chains 120_1 to 120_p-1 based on equations to be described later below.

In an embodiment, the beam determination module 141 may form a reception beam defined by Equation 3 through the p$^{th}$ antenna array 110_p using the p$^{th}$ control signal CS$_p$.

$$W_{s,p} = \begin{bmatrix} w_{s,p,1} \\ \vdots \\ w_{s,p,M} \end{bmatrix} \quad \text{[Equation 3]}$$

W$_{s,p}$ is a matrix indicating a reception beam formed in the p$^{th}$ antenna array 110_p, and may include M reception beam matrices, which is the number of reference signals transmitted from the base station 10 to the terminal 20 using the same transmission beam.

In an embodiment, the beam determination module 141 may receive reference signals according to Equation 2 from the base station 10 by forming first reception beams through the antenna arrays 110_1 to 110_p based on Equation 3. The beam determination module 141 may measure reference signals respectively received based on the first reception beams.

In an embodiment, the beam determination module 141 may estimate a downlink channel gain based on the reference signals and reception array response information matching or corresponding to characteristics of the antenna module 110a. A reception array response matrix of the reception array response information may be defined as in Equation 4.

$$a(\phi) = \frac{1}{\sqrt{N_{ant}}} \left[ 1, e^{j\frac{2\pi}{\lambda} d \sin \phi}, \ldots, e^{j\frac{2\pi}{\lambda} d(N_{ant}-1)\sin \phi} \right] \quad \text{[Equation 4]}$$

a(φ) is a reception array response matrix. φ is an angle of arrival, which is an angle obtained by measuring a direction in which a main portion of propagation energy of a reference signal arrives with respect to a horizontal line, when the reference signal is received by the antenna module 110a. λ is a wavelength of the received reference signal, and d is a distance between antenna elements. Equation 4 assumes that the antenna module 110a has a uniform linear array structure. Equation 4 may be modified according to implementation of the antenna module 110a.

In an embodiment, the beam determination module 141 may estimate a downlink channel gain as in Equation 5.

$$\min_{S_p} \| Y_{s,p} - W_{s,p} A_{R,p} S_p \| \quad \text{[Equation 5]}$$

$$A_{R,p} = R_p [a(\bar{\phi}_1) \ldots a(\bar{\phi}_L)]$$

S$_p$ is a channel gain for each angle of arrival in the p$^{th}$ RF chain 120_p (or the p$^{th}$ antenna module 110_p). A$_{R,p}$ is a reception array response matrix for each angle of arrival in the p$^{th}$ RF chain 120_p (or the p$^{th}$ antenna module 110_p). In this specification, reception array response matrices for angles of arrival are defined as included in reception array response information. $\bar{\phi}_L$ is an L$^{th}$ quantized angle of arrival. The angles of arrival applied to the reception array response matrices may be preset to have a certain number and a certain offset.

The beam determination module 141 may estimate a channel gain S$_p$ for each angle of arrival that minimizes a difference between a reference signal Y$_s$,p received by the p$^{th}$ antenna array 110_p and a multiplication result of a matrix W$_{s,p}$ corresponding to a reception beam formed in the p$^{th}$ antenna array 110_p, a reception array response matrix A$_R$,p for each angle of arrival in the p$^{th}$ RF chain 120_p (or the p$^{th}$ antenna module 110_p), and a channel gain S$_p$ for each angle of arrival in the p$^{th}$ RF chain 120_p (or the p$^{th}$ antenna module 110_p).

In an embodiment, the beam determination module 141 may estimate (or reconfigure) a channel of the downlink DL based on Equation 6 using the estimated channel gain S$_p$ for each angle of arrival when the channel of the downlink DL has a sparse characteristic in an angular domain and the number of preset angles of arrival is greater than or equal to the threshold number.

$$\hat{H}_{R,p} = A_{R,p} S_p \quad \text{[Equation 6]}$$

$\hat{H}_{R,p}$ is a downlink DL channel related matrix corresponding to the p$^{th}$ RF chain 120_p (or p$^{th}$ antenna module 110_p), and may be estimated based on a multiplication operation of the reception array response matrix A$_{R,p}$ for each angle of arrival in the p$^{th}$ RF chain 120_p (or p$^{th}$ antenna module 110_p) and the channel gain S$_p$ for each angle of arrival in the p$^{th}$ RF chain 120_p.

In an embodiment, the beam determination module 141 may calculate downlink channel states using the downlink DL channel related matrix $\hat{H}_{R,p}$ and reception beam matrices, and may determine a second reception beam from a result of the calculation. For example, the beam determination module 141 may calculate downlink channel states based on the channel capacity as shown in Equation 7 and determine a second reception beam from a result of the calculation.

$$\arg\max_{\check{W}\in\mathcal{W}} \log_2 \left| \sigma^2 I + \check{W}\hat{H}_R(\check{W}\hat{H}_R)^H \right| \quad \text{[Equation 7]}$$

$\check{W}$ is a reception beam matrix, W is a set of possible reception beam matrices, and $\hat{H}_R$ is the downlink DL channel related matrix. The beam determination module 141 may determine $\check{W}$ corresponding to the best channel capacity result from among channel capacity calculation results as a second reception beam.

As another example, the beam determination module 141 may calculate downlink channel states based on SINR as shown in Equation 8 and determine a second reception beam from a result of the calculation.

$$\arg\max_{\check{w}_p\in\mathcal{W}_p} \frac{\left|\check{w}_p\hat{H}_R\right|^2}{\sigma_n^2} \quad \text{[Equation 8]}$$

$\check{w}_p$ is a reception beam matrix in the $p^{th}$ RF chain 120_p (or the $p^{th}$ antenna module 110_p), Cambria Math is a set of possible reception beam matrices in the $p^{th}$ RF chain 120_p (or the $p^{th}$ antenna module 110_p), and $H_R$ is the downlink DL channel related matrix. The beam determination module 141 may determine $\check{w}_p$ corresponding to the best SINR from among SINR calculation results as a sub-reception beam included in a second reception beam. The beam determination module 141 may determine sub-reception beams in the other RF chains 120_1 to 120_p-1 (or the other antenna modules 110_1 to 110_p-1) based on Equation 8. The second reception beam may include the determined sub-reception beams.

In an embodiment, the beam determination module 141 may estimate (or reconfigure) an uplink channel as in Equation 9 using the downlink channel gain generated based on Equation 5.

$$\hat{H}_{T,p}=A_{T,p}S_p \quad \text{[Equation 9]}$$

$\hat{H}_{T,p}$ is an uplink UL channel related matrix corresponding to the $p^{th}$ RF chain (not shown) (or the $p^{th}$ antenna array (not shown) of the second RFIC 130, and may be estimated based on a multiplication operation of a transmission array response matrix $A_{T,p}$ for each angle of departure in the $p^{th}$ RF chain (not shown) (or the $p^{th}$ antenna array (not shown) of the second RFIC 130 and a channel gain $S_p$ for each angle of arrival in the $p^{th}$ RF chain (not shown) (or the $p^{th}$ antenna array 110_p) of the first RFIC 100.

In an embodiment, the beam determination module 141 may calculate uplink channel states using the uplink UL channel related matrix $\hat{H}_{T,p}$ and transmission beam matrices, and may determine a transmission beam from a result of the calculation. For example, the beam determination module 141 may calculate downlink channel states based on the channel capacity as shown in Equation 7 and determine a second reception beam from a result of the calculation.

$$\arg\max_{\check{V}\in\mathcal{V}} \log_2\left|\sigma^2 I + \check{V}\hat{H}_T(\check{V}\hat{H}_T)^H\right| \quad \text{[Equation 10]}$$

$\check{V}$ is a transmission beam matrix, V is s a set of possible transmission beam matrices, and $H_T$ is a channel related matrix of the uplink UL. The beam determination module 141 may determine $\check{v}_p$ corresponding to the best channel capacity result from among channel capacity calculation results as a transmission beam.

As another example, the beam determination module 141 may calculate uplink channel states based on SINR as shown in Equation 11 and determine a transmission beam from a result of the calculation.

$$\arg\max_{\check{v}_p\in\mathcal{V}_p} \frac{\left|\check{v}_p\hat{H}_R\right|^2}{\sigma_p^2} \quad \text{[Equation 11]}$$

$\check{v}_p$ is a transmission beam matrix of the $p^{th}$ RF chain (not shown) (or the $p^{th}$ antenna array (not shown)) of the second RFIC 130, Cambria Math is a set of possible transmission beam matrices of the $p^{th}$ RF chain (not shown) (or the $p^{th}$ antenna array (not shown)) of the second RFIC 130, and $H_T$ is a channel related matrix of the uplink UL. The beam determination module 141 may determine P, corresponding to the best SINR among SINR calculation results as a sub transmission beam included in a transmission beam. The beam determination module 141 may determine sub transmission beams of other RF chains (or other antenna modules) of the second RFIC 130 based on Equation 11. The transmission beam may include the determined sub transmission beams.

In an embodiment, the beam determination module 141 may estimate (or reconfigure) an uplink channel as in Equation 12 using the downlink DL channel related matrix generated based on Equation 6.

$$\hat{H}_{T,p}=C_p\hat{H}_{R,p} \quad \text{[Equation 12]}$$

$\hat{H}_{T,p}$ is an uplink UL channel related matrix corresponding to the $p^{th}$ antenna array (not shown) of the second RFIC 130, $H_R,p$ is a downlink DL channel related matrix corresponding to the $p^{th}$ RF chain 120_p (or the $p^{th}$ antenna array 110_p) of the first RFIC 100, and C, is downlink-uplink calibration information corresponding to the $p^{th}$ RF chain 120_p (or the $p^{th}$ antenna array 110_p) of the first RFIC 100.

In an embodiment, the beam determination module 141 may determine a transmission beam based on Equation 10 or 11 by using the downlink DL channel related matrix generated through Equation 12.

In an embodiment, the beam determination module 141 may determine at least one of a second reception beam and a transmission beam with reference to transmission/reception beam pair information. For example, the transmission/reception beam pair information may include a plurality of transmission/reception beam pairs. The beam determination module 141 may determine one of reception beams included in the transmission/reception beam pair information as a second reception beam by applying the reception beams included in the transmission/reception beam pair information to Equation 7 or 8.

For example, when the second reception beam is determined by calculating all reception beams without referring to the transmission/reception beam pair information, the beam determination module 141 may search for a third reception beam corresponding to the second reception beam in the transmission/reception beam pair information, and determine a beam paired with the third reception beam as a transmission beam. As another example, when the second reception beam is determined by calculating only certain reception beams with reference to the transmission/reception beam pair information, the beam determination module 141 may determine a beam forming a pair with the second reception beam in the transmission/reception beam pair information as a transmission beam.

The controller 140 may receive a downlink signal from the base station 10 using the second reception beam and the transmission beam determined in the above-described manner, respectively, and transmit an uplink signal to the base station 10.

However, the embodiments shown in FIGS. 2A and 2B are merely examples, and the inventive concept is not limited thereto. In order to compensate for imperfect channel reciprocity between the downlink DL and the uplink UL caused by a structural difference between the first and second RFICs 100 and 130, various embodiments of determining transmission/reception beams based on a downlink channel gain may be applied.

In an embodiment, the controller 140 may be implemented as an artificial intelligence processor. For example, the beam determination module 141 may generate at least one of reception array response information, transmission array response information, downlink-uplink calibration information, and transmission/reception beam pair information according to channel states of the downlink DL and the uplink UL and a hardware structure of the first RFIC 100 and the second RFIC 130 through deep learning, and may store the information in a storage device in the terminal 20. Any one of various artificial intelligence models may be applied to the beam determination module 141.

Figure 3:
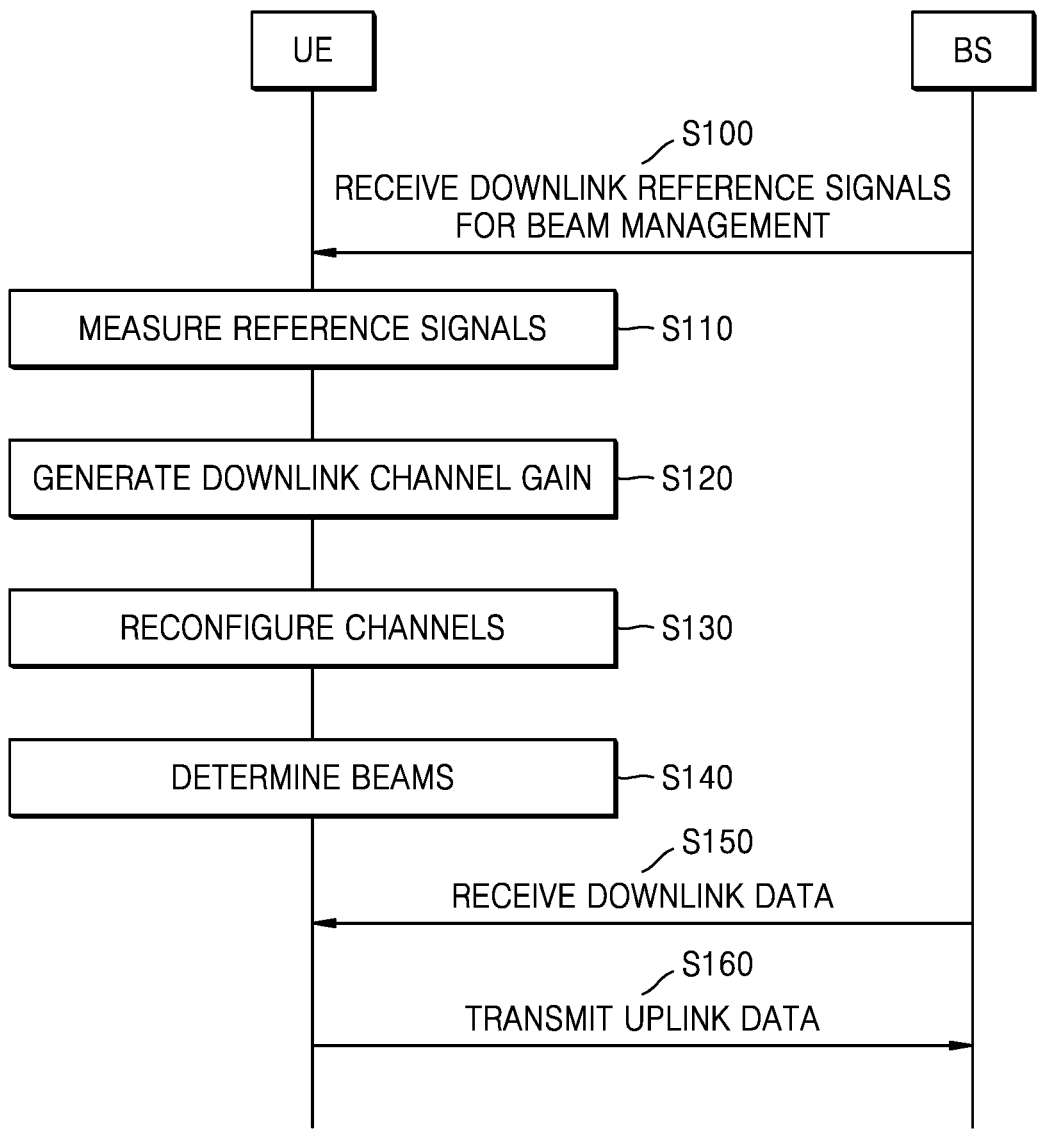
FIG. 3 is a flowchart illustrating a method of operating a terminal, according to an embodiment.

FIG. 3 is a flowchart illustrating a method of operating a terminal, according to an embodiment.

Referring to FIG. 3, in operation S100, a terminal UE may receive downlink reference signals for beam management from a base station BS. In this disclosure, beam management refers to determining an optimal reception beam and an transmission beam in order for the terminal UE to communicate with the base station BS. The terminal UE may receive reference signals from the base station BS based on first reception beams by sweeping the first reception beams.

In operation S110, the terminal UE may measure the received reference signals.

In operation S120, the terminal UE may generate a downlink channel gain based on the measured reference signals and reception array response information matching or corresponding to reception antenna characteristics. In an embodiment, the terminal UE may calculate a downlink channel gain that minimizes a difference between the reference signals and a result of multiplication of the downlink channel gain, reception array response information and a reception beam matrix. In embodiments, the reception beam matrix may correspond to first reception beams for the terminal UE to receive the reference signals in operation S100. In an embodiment, the downlink channel gain may include a channel gain for each angle of arrival in each of a plurality of RF chains of the terminal UE.

In operation S130, the terminal UE may reconfigure at least one of a downlink channel and an uplink channel based on the downlink channel gain. In an embodiment, the terminal UE may reconfigure a downlink channel by generating a downlink channel related matrix based on multiplication of the downlink channel gain and the reception array response information. That is, the terminal UE may reconfigure a downlink channel by applying an actual downlink channel gain in each of reception antenna arrays and RF chains connected thereto. In an embodiment, the terminal UE may reconfigure an uplink channel using a downlink channel gain. In an embodiment, the terminal UE may reconfigure an uplink channel by applying downlink-uplink calibration information to the reconfigured downlink channel.

In operation S140, the terminal UE may determine a second reception beam and a transmission beam using at least one of the reconfigured downlink channel and the reconfigured uplink channel.

In operation S150, the terminal UE may receive downlink data from the base station BS using the determined second reception beam.

In operation S160, the terminal UE may transmit uplink data to the base station BS using the determined transmission beam.

Figure 4:
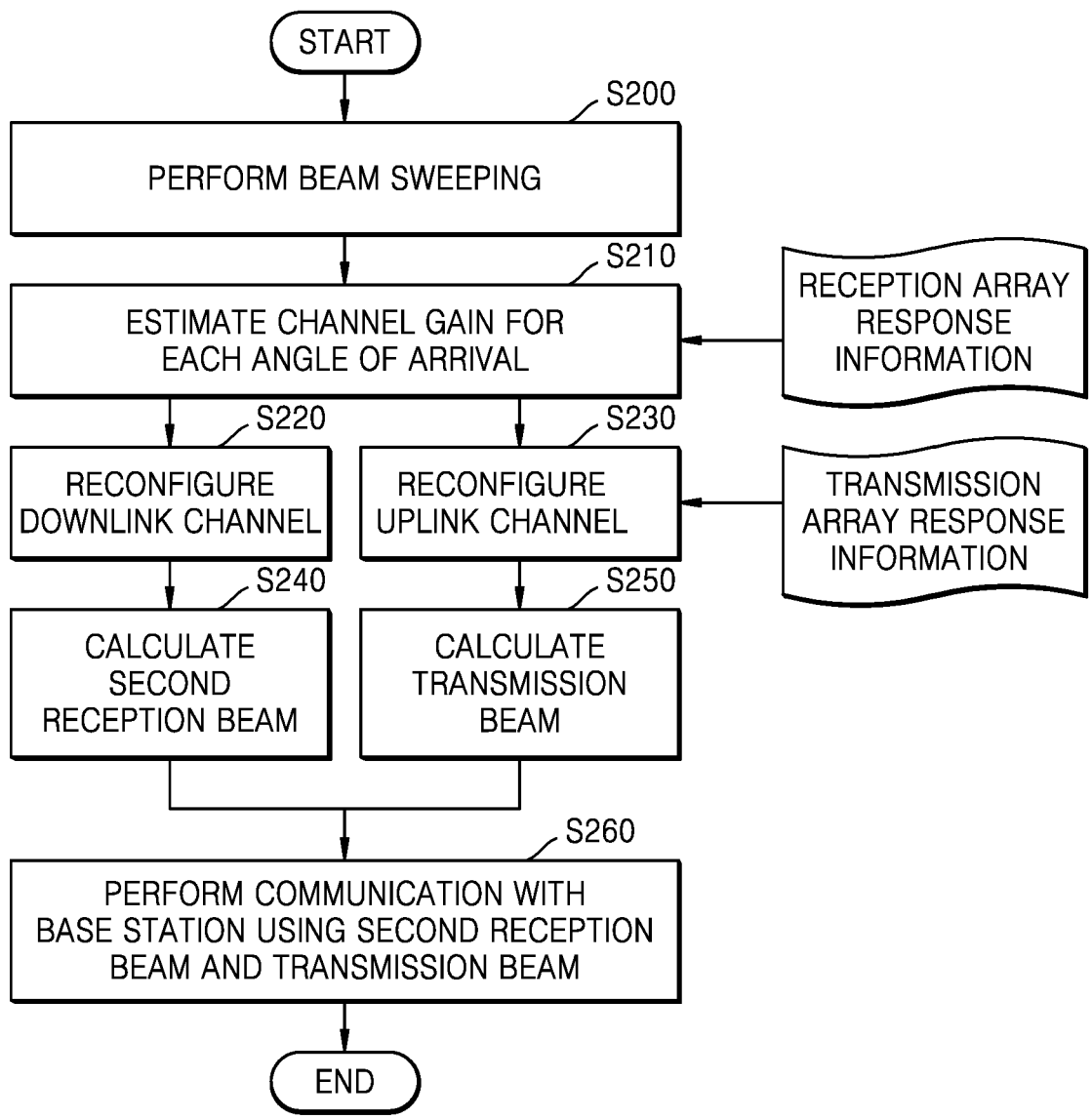
FIG. 4 is a flowchart illustrating a method of operating a terminal by using reception array response information and transmission array response information, according to an embodiment.

FIG. 4 is a flowchart illustrating a method of operating a terminal using reception array response information and transmission array response information, according to an embodiment.

Referring to FIG. 4, in operation S200, a terminal may receive reference signals from a base station by performing beam sweeping on a plurality of first reception beams.

In operation S210, the terminal may estimate a downlink channel gain including a channel gain for each angle of arrival by using reception array response information. In an embodiment, the reception array response information includes first information matrices respectively corresponding to a plurality of first RF chains connected to reception antenna arrays included in the terminal, and preset angles of arrival may be applied to the first information matrices. In addition, the terminal may generate downlink channel gains respectively corresponding to the plurality of first RF chains.

In operation S220, the terminal may reconfigure a downlink channel based on the downlink channel gains and the reception array response information.

In operation S230, the terminal may reconfigure an uplink channel based on an uplink channel gain and transmission array response information. In an embodiment, the transmission array response information includes second information matrices respectively corresponding to a plurality of second RF chains connected to transmission antenna arrays included in the terminal, and preset angles of departure may be applied to second information matrices.

In operation S240, the terminal may calculate a second reception beam by using the reconfigured downlink channel.

In operation S250, the terminal may calculate a transmission beam by using the reconfigured uplink channel.

In operation S260, the terminal may perform communication with the base station using the calculated second reception beam and the calculated transmission beam.

Figure 5:
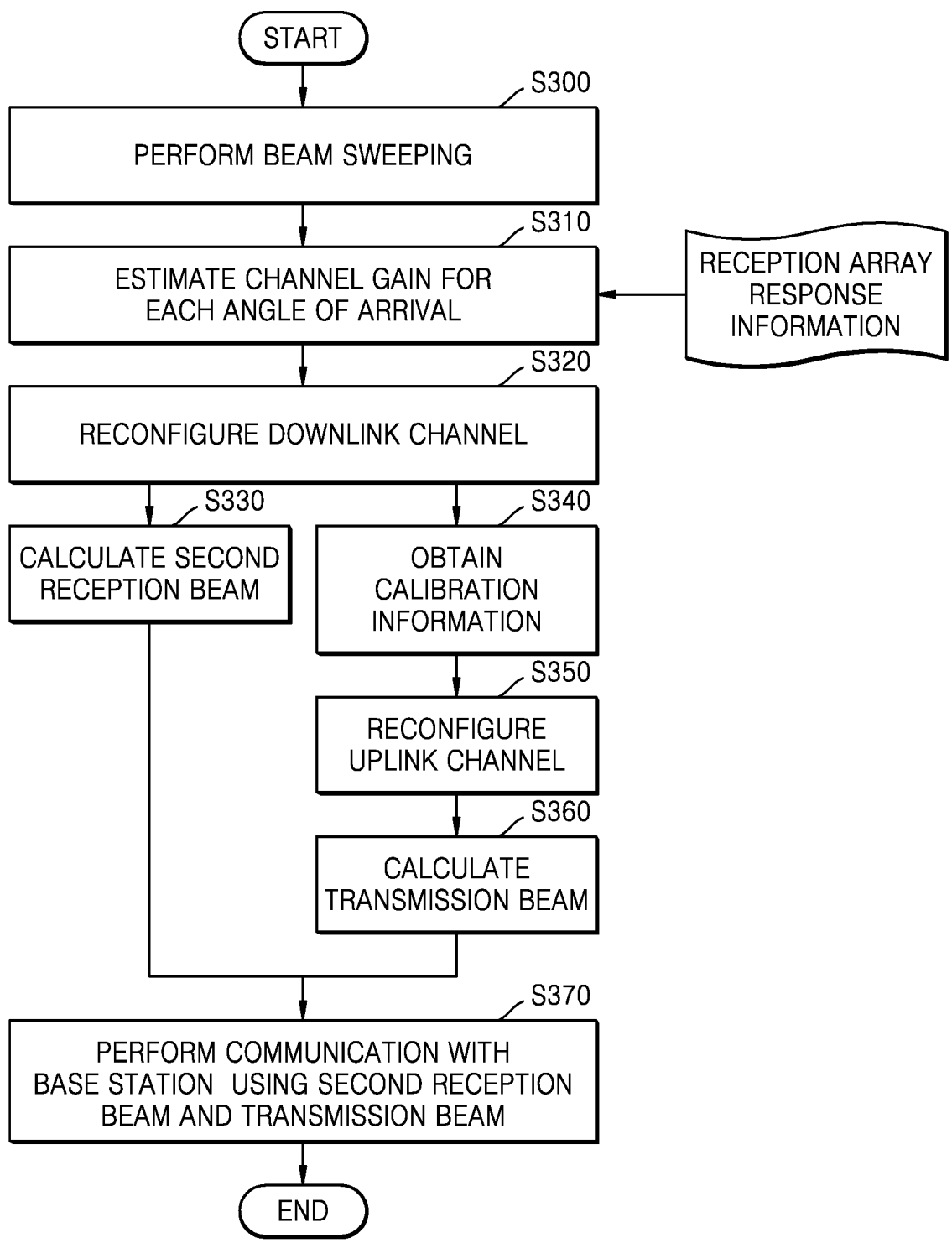
FIG. 5 is a flowchart illustrating a method of operating a terminal by using reception array response information, according to an embodiment.

FIG. 5 is a flowchart illustrating a method of operating a terminal using reception array response information, according to an embodiment. In FIG. 5, like reference numerals to those in FIG. 4 denote like elements, and therefore, repeated descriptions thereof will not be given herein.

Referring to FIG. 5, in operation S300, a terminal may receive reference signals from a base station by performing beam sweeping on a plurality of first reception beams.

In operation S310, the terminal may estimate a downlink channel gain including a channel gain for each angle of arrival by using reception array response information.

In operation S320, the terminal may reconfigure a downlink channel based on the downlink channel gain and the reception array response information.

In operation S330, the terminal may calculate a second reception beam by using the reconfigured downlink channel.

In operation S340, the terminal may obtain calibration information between a downlink and an uplink.

In operation S350, the terminal may reconfigure an uplink channel by applying the calibration information to the reconfigured downlink channel.

In operation S360, the terminal may calculate a transmission beam by using the reconfigured uplink channel.

In operation S370, the terminal may perform communication with the base station using the calculated second reception beam and the calculated transmission beam.

Figure 6:
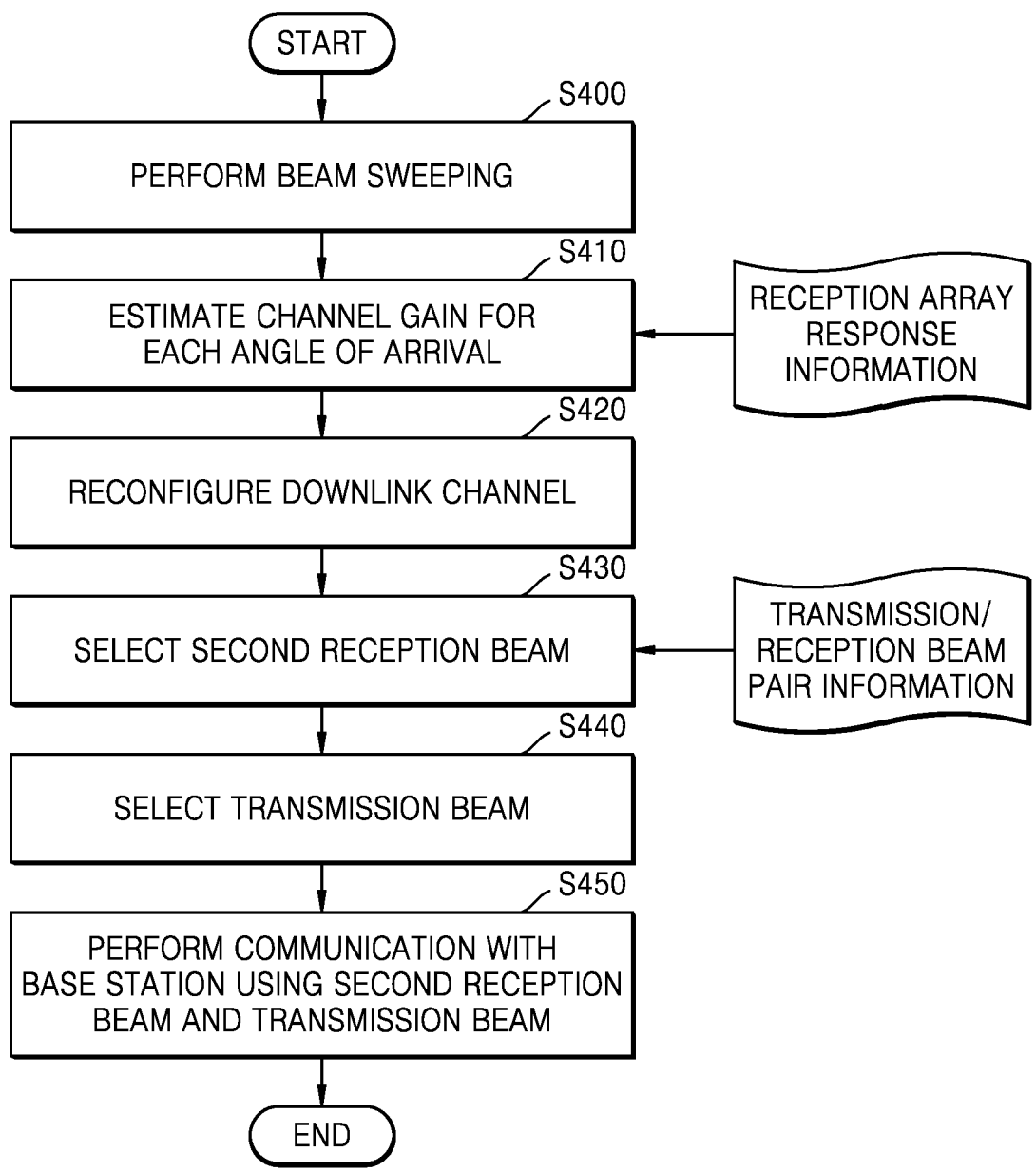
FIGS. 6 and 7 are flowcharts illustrating a method of operating a terminal by using reception array response information and transmission/reception beam pair information, according to an embodiment.
Figure 7:
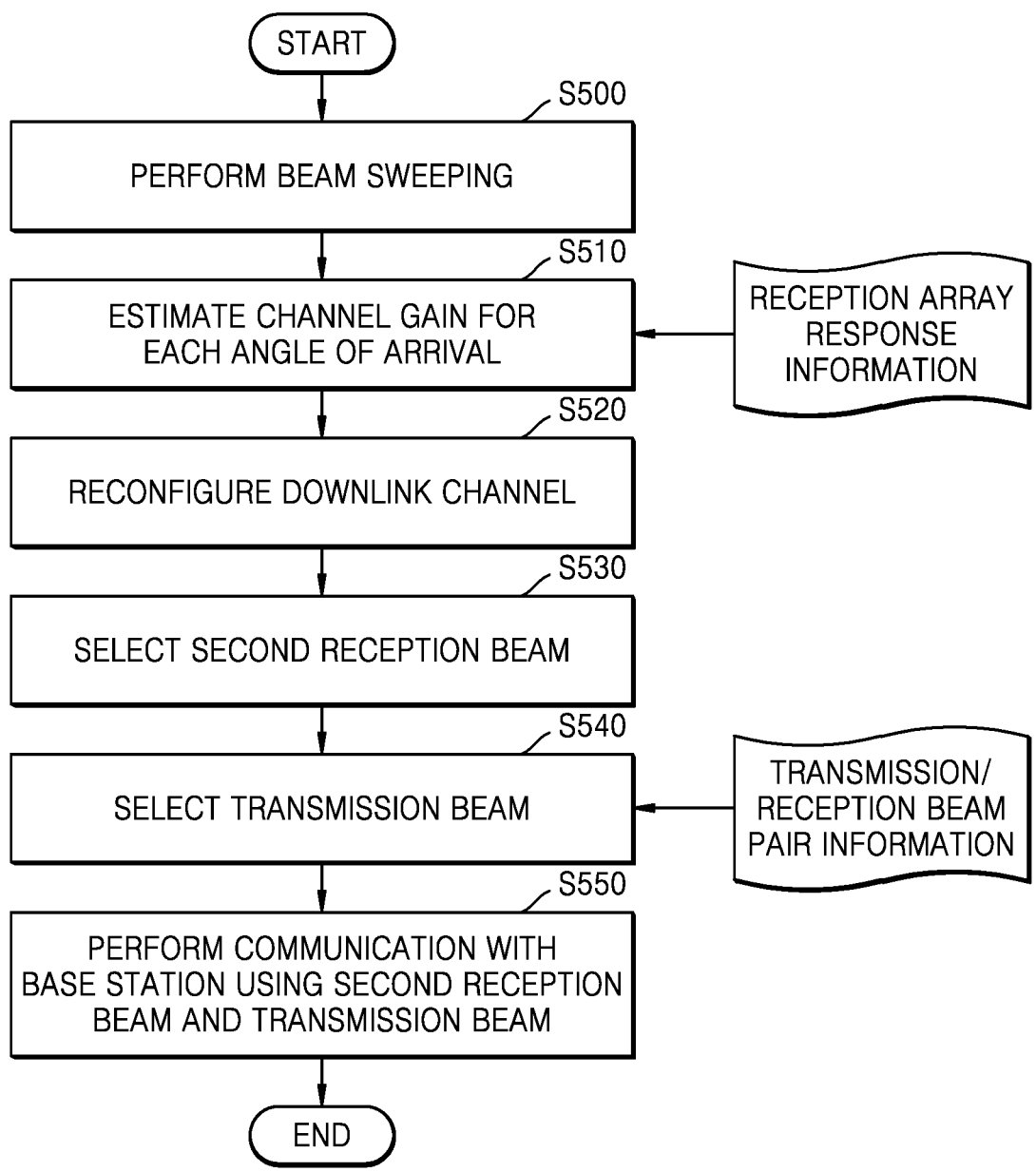

FIGS. 6 and 7 are flowcharts illustrating a method of operating a terminal using reception array response information and transmission/reception beam pair information, according to an embodiment. In FIGS. 6 and 7, like reference numerals to those in FIG. 4 denote like elements, and therefore, repeated descriptions thereof will not be given herein.

Referring to FIG. 6, in operation S400, a terminal may receive reference signals from a base station by performing beam sweeping on a plurality of first reception beams.

In operation S410, the terminal may estimate a downlink channel gain including a channel gain for each angle of arrival by using reception array response information.

In operation S420, the terminal may reconfigure a downlink channel based on the downlink channel gain and the reception array response information.

In operation S430, the terminal may select a second reception beam from third reception beams by using reception beam matrices corresponding to third reception beams included in transmission/reception beam pair information and the reconfigured downlink channel with reference to the transmission/reception beam pair information.

In operation S440, the terminal may select a beam forming a pair with the selected second reception beam as a transmission beam with reference to the transmission/reception beam pair information.

In operation S450, the terminal may perform communication with the base station using the selected second reception beam and the selected transmission beam.

Referring further to FIG. 7, in operation S500, a terminal may receive reference signals from a base station by performing beam sweeping on a plurality of first reception beams.

In operation S510, the terminal may estimate a downlink channel gain including a downlink channel gain for each angle of arrival by using reception array response information.

In operation S520, the terminal may reconfigure a downlink channel based on the downlink channel gain and the reception array response information.

In operation S530, the terminal may calculate a second reception beam by using the reconfigured downlink channel.

In operation S540, the terminal may search for a third reception beam most similar to the second reception beam calculated from transmission/reception beam pair information with reference to the transmission/reception beam pair information, and may select a beam forming a pair with the third reception beam as a transmission beam.

In operation S550, the terminal may perform communication with the base station using the selected second reception beam and the selected transmission beam.

Figure 8:
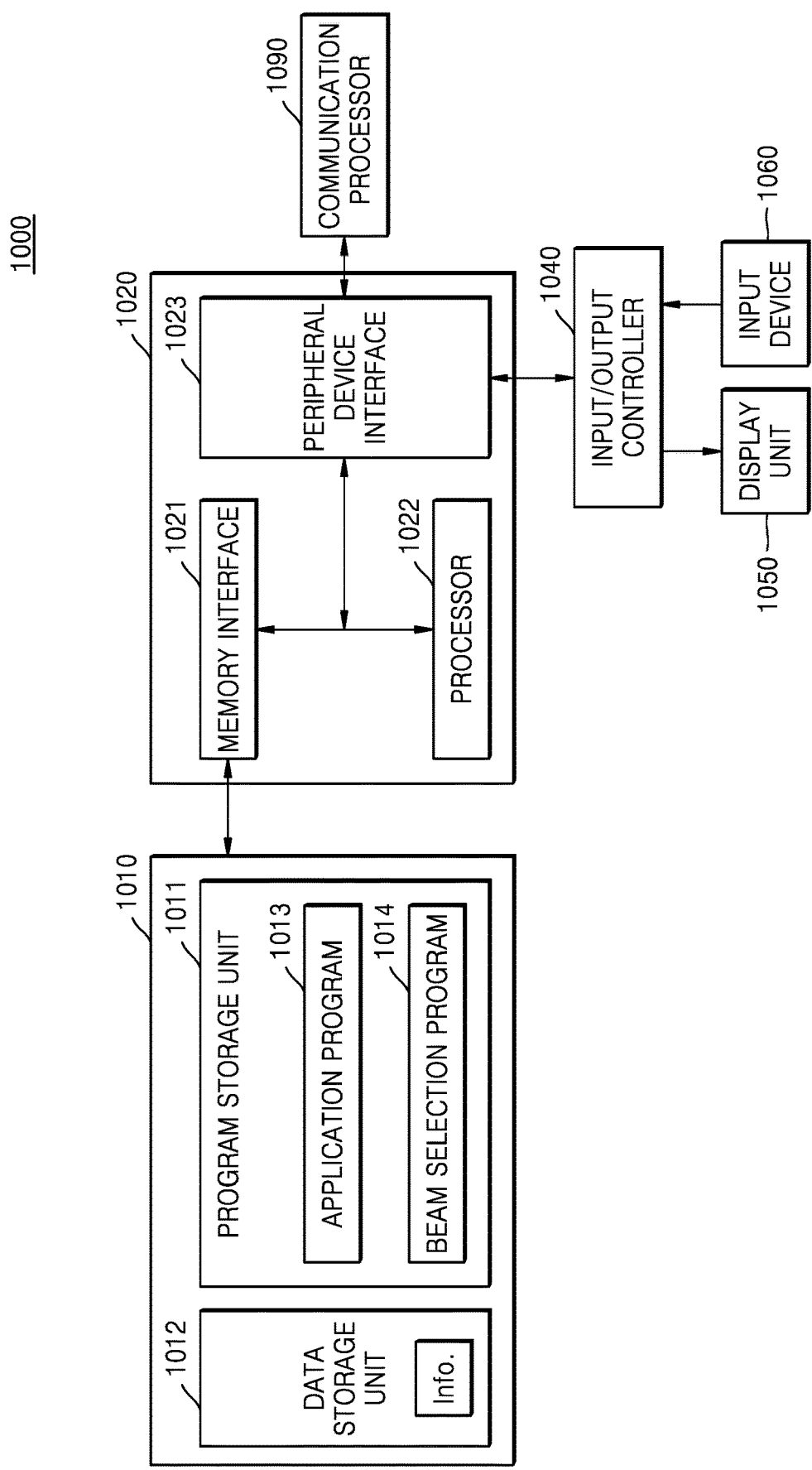
FIG. 8 is a block diagram of an electronic device according to an embodiment.

FIG. 8 is a block diagram of a communication device 1000 according to an embodiment. The communication device 100 may be any one of the examples of the terminal described above or a base station.

Referring to FIG. 8, the communication device 1000 may include a memory 1010, a processor unit 1020, an input/output controller 1040, a display unit 1050, an input device 1060, and a communication processor 1090. Here, a plurality of memories 1010 may be included. The components are as follows.

The memory 1010 may include a program storage unit 1011 for storing a program for controlling operations of the communication device 1000 and a data storage unit 1012 for storing data generated during program execution. The data storage unit 1012 may store data necessary for operations of an application program 1013 and a beam selection program 1014. In an embodiment, the data storage unit 1012 may store information (Info.) including at least one of reception array response information, transmission array response information, and transmission/reception beam pair information required for a beam selection operation according to embodiments of the disclosure.

The program storage unit 1011 may include the application program 1013 and the beam selection program 1014. Here, the program included in the program storage unit 1011 is a set of instructions, which may be expressed as an instruction set. The application program 1013 may include program codes for executing various applications operating in the communication device 1000. In other words, the application program 1013 may include codes (or commands) related to various applications driven by a processor 1022. The beam selection program 1014 may include control codes for determining a reception beam and a transmission beam according to embodiments. In an embodiment, the processor 1022 may generate a downlink channel gain for compensating for imperfect channel reciprocity between a downlink and an uplink by executing the beam selection program 1014, and may determine a reception beam and a transmission beam based on this.

Meanwhile, the electronic device 2000 may include the communication processor 1090 that performs a communication function for voice communication and data communication. The processor 1022 may control beam sweeping on reception beams formed in the communication processor 1090 to receive reference signals from a base station through the communication processor 1090.

A peripheral device interface 1023 may control connection between the input/output controller 1040, the communication processor 1090, the processor 1022, and a memory interface 1021. The processor 1022 controls a plurality of base stations to provide a corresponding service using at least one software program. The processor 1022 may execute at least one program stored in the memory 1010 to provide a service corresponding to the program.

The input/output controller 1040 may provide an interface between an input/output device such as the display unit 1050 and the input device 1060 and the peripheral device interface 1023. The display unit 1050 displays state information, input characters, moving pictures, still pictures, and the like. For example, the display unit 1050 may display application program information driven by the processor 1022.

The input device 1060 may provide input data generated by selection of the electronic device to the processor unit 1020 through the input/output controller 1040. The input device 1060 may include a keypad including at least one hardware button and a touchpad for sensing touch information. For example, the input device 1060 may provide touch information such as a touch, a touch movement, and a touch release sensed through a touchpad to the processor 1022 through the input/output controller 1040.

Figure 9:
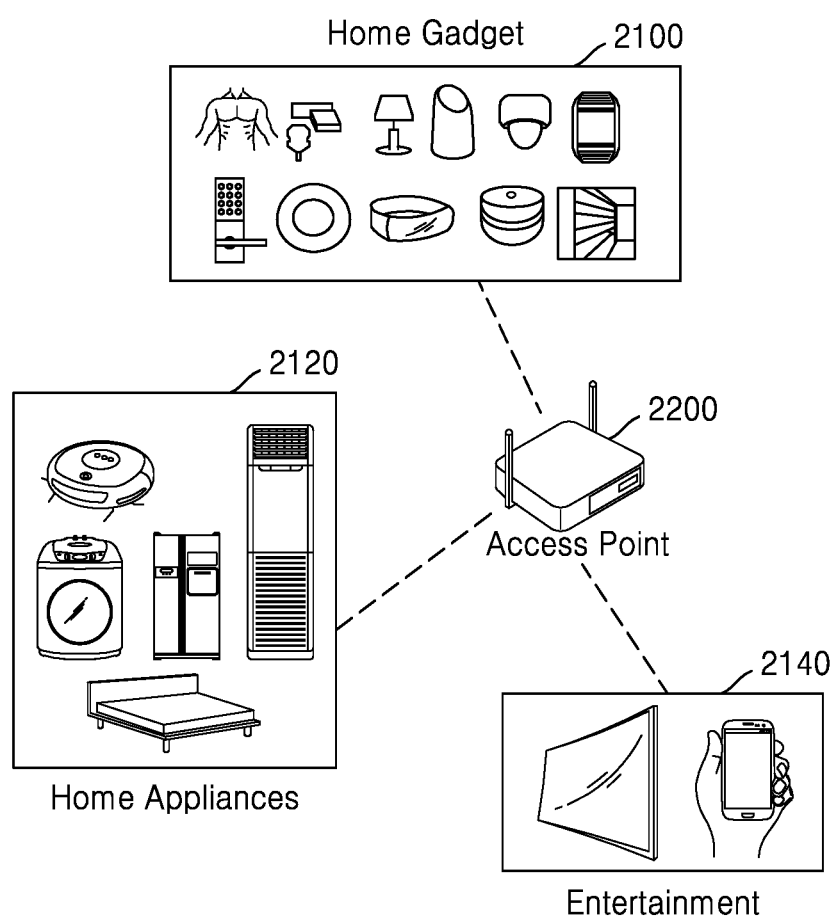
FIG. 9 is a view of communication devices that determine a reception beam and a transmission beam, according to an embodiment.

FIG. 9 is a view of communication devices that determine a reception beam and a transmission beam according to an embodiment.

Referring to FIG. 9, a home gadget 2100, home appliances 2120, an entertainment device 2140, and an access point (AP) 2200 may estimate a downlink channel gain considering their hardware characteristics according to embodiments, and may estimate (or reconfigure) at least one channel of a downlink and an uplink using the estimated downlink channel gain. In an embodiment, the home gadget 2100, the home appliances 2120, the entertainment device 2140, and the AP 2200 may determine a reception beam and a transmission beam by using the estimated downlink channel or the estimated uplink channel. The home gadget 2100, the home appliances 2120, the entertainment device 2140, and the AP 2200 may perform mutual communication using the determined reception beam and transmission beam. In some embodiments, the home appliance 2100, the household appliance 2120, the entertainment device 2140, and the AP 2200 may configure an Internet of Things (IoT) network system. It should be understood that the communication devices shown in FIG. 9 are only examples, and an embodiment of the disclosure may be applied to other communication devices not shown in FIG. 9.

While the inventive concept has been particularly shown and described with reference to the above embodiments thereof, it will be understood that various changes in form and details may be made therein without departing from the spirit and scope of the following claims.

What is claimed is:

1. A method of operating a communication device, the method comprising:
    sweeping a plurality of first reception beams;
    measuring reference signals, received from another communication device, based on the plurality of first reception beams;
    estimating a downlink channel gain based on the measured reference signals and reception array response information corresponding to reception antenna characteristics of the communication device;
    generating a downlink channel related matrix based on the downlink channel gain and the reception array response information;
    determining a second reception beam based on the downlink channel related matrix;
    determining a transmission beam based on at least one of the downlink channel gain, the downlink channel related matrix and the second reception beam; and
    performing communication with the other communication device using the second reception beam and the transmission beam.

2. The method of claim 1, wherein the estimating of the downlink channel gain comprises determining the downlink channel gain that minimizes a difference between the measured reference signals and a result of multiplication of the downlink channel gain, the reception array response information and a reception beam matrix.

3. The method of claim 2, wherein the reception array response information comprises information matrices respectively corresponding to a plurality of radio frequency (RF) chains included in the communication device, and
    wherein preset angles of arrival are applied to the information matrices.

4. The method of claim 3, wherein the downlink channel gain comprises a channel gain for each angle of arrival in each of the plurality of RF chains.

5. The method of claim 1, wherein the generating of the downlink channel related matrix comprises multiplying the downlink channel gain and the reception array response information to calculate the downlink channel related matrix.

6. The method of claim 5, wherein the determining of the second reception beam comprises:
    calculating downlink channel states using the downlink channel related matrix and reception beam matrices; and
    determining the second reception beam from the reception beam matrix corresponding to a best state from among the downlink channel states.

7. The method of claim 6, wherein the downlink channel states indicate at least one of a channel capacity and a Signal-to-Interference-plus-Noise Ratio (SINR).

8. The method of claim 6, wherein the reception beam matrices correspond to third reception beams included in transmission/reception beam pair information, and
    wherein the second reception beam is one of the third reception beams.

9. The method of claim 1, wherein the determining of the transmission beam comprises:
    calculating an uplink channel related matrix by multiplying the downlink channel gain and transmission array response information; and
    determining the transmission beam based on the uplink channel related matrix.

10. The method of claim 9, wherein the determining of the transmission beam comprises:
    calculating uplink channel states using the uplink channel related matrix and transmission beam matrices; and
    determining the transmission beam from a transmission beam matrix corresponding to a best state from among the uplink channel states.

11. The method of claim 1, wherein the determining of the transmission beam comprises: determining the transmission beam corresponding to the second reception beam with reference to transmission/reception beam pair information.

12. The method of claim 1, wherein the determining of the transmission beam comprises:
    generating an uplink channel related matrix based on downlink-uplink calibration information and the downlink channel related matrix;
    calculating uplink channel states using the uplink channel related matrix and transmission beam matrices; and
    determining the transmission beam from a transmission beam matrix corresponding to a best state from among the uplink channel states.

13. A communication device comprising:
    a plurality of reception antenna arrays;
    a plurality of first radio frequency (RF) chains respectively connected to the plurality of reception antenna arrays; and
    a controller configured to control the plurality of reception antenna arrays and the plurality of first RF chains,
    wherein the controller is configured to sweep a plurality of first reception beams using the plurality of reception antenna arrays, measure reference signals received from another communication device based on the plurality of first reception beams, estimate a downlink channel gain based on the measured reference signals and reception array response information corresponding to characteristics of the plurality of reception antenna arrays, generate a downlink channel related matrix based on the downlink channel gain and the reception array response information, determine a second reception beam based on the downlink channel related matrix, determine a transmission beam based on at least one of the downlink channel gain, the downlink channel related matrix and the second reception beam, and control communication with the other communication device using the second reception beam and the transmission beam.

14. The communication device of claim 13, wherein the downlink channel gain has a value that minimizes a difference between the measured reference signals and a multiplication result of the downlink channel gain, the reception array response information and a reception beam matrix.

15. The communication device of claim 13, wherein the reception array response information comprises information matrices respectively corresponding to the plurality of first RF chains, and
wherein preset angles of arrival are applied to the information matrices.

16. The communication device of claim 13, wherein the downlink channel related matrix is generated through multiplication of the downlink channel gain and the reception array response information.

17. The communication device of claim 13, further comprising:
a plurality of transmission antenna arrays; and
a plurality of second RF chains respectively connected to the plurality of transmission antenna arrays,
wherein the controller is further configured to generate an uplink channel related matrix by multiplying the downlink channel gain and transmission array response information, calculate uplink channel states using the uplink channel related matrix and transmission beam matrices, and determine the transmission beam based on the uplink channel states,
wherein the transmission array response information comprises information matrices which correspond to each of the plurality of second RF chains and to which preset angles of departure are applied.

18. The communication device of claim 13, wherein the controller is configured to generate an uplink channel related matrix based on downlink-uplink calibration information and the downlink channel related matrix, calculate uplink channel states using the uplink channel related matrix and transmission beam matrices, and determine the transmission beam from a transmission beam matrix corresponding to a best state from among the uplink channel states.

19. A method of operating a communication device, the method comprising:
sweeping a plurality of first reception beams;
measuring reference signals, received from another communication device, based on the plurality of first reception beams;
estimating a downlink channel gain based on the measured reference signals and reception array response information corresponding to reception antenna characteristics of the communication device;
reconfiguring a downlink channel based on the downlink channel gain;
reconfiguring an uplink channel based on at least one of the downlink channel gain and the reconfigured downlink channel;
determining a transmission beam and a reception beam based on the reconfigured downlink channel and the reconfigured uplink channel; and
performing communication with the other communication device using the reception beam and the transmission beam.

20. The method of claim 19, wherein the estimating of the downlink channel gain comprises calculating the downlink channel gain that minimizes a difference between the measured reference signals and a multiplication result of the downlink channel gain, the reception array response information and a reception beam matrix.

* * * * *